E. M. PIERSON.
Switch for Galvanic Batteries.

No. 108,513.

Patented Oct. 18, 1870.

Witnesses.
E. M. Pierson

E. M. PIERSON.
Switch for Galvanic Batteries.
No. 108,513.
2 Sheets—Sheet 2.
Patented Oct. 18, 1870.
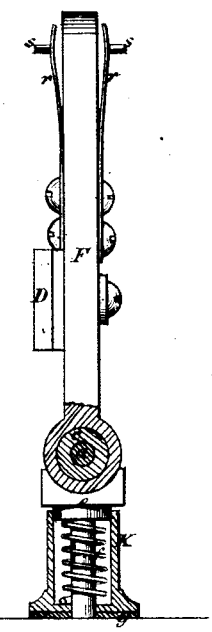
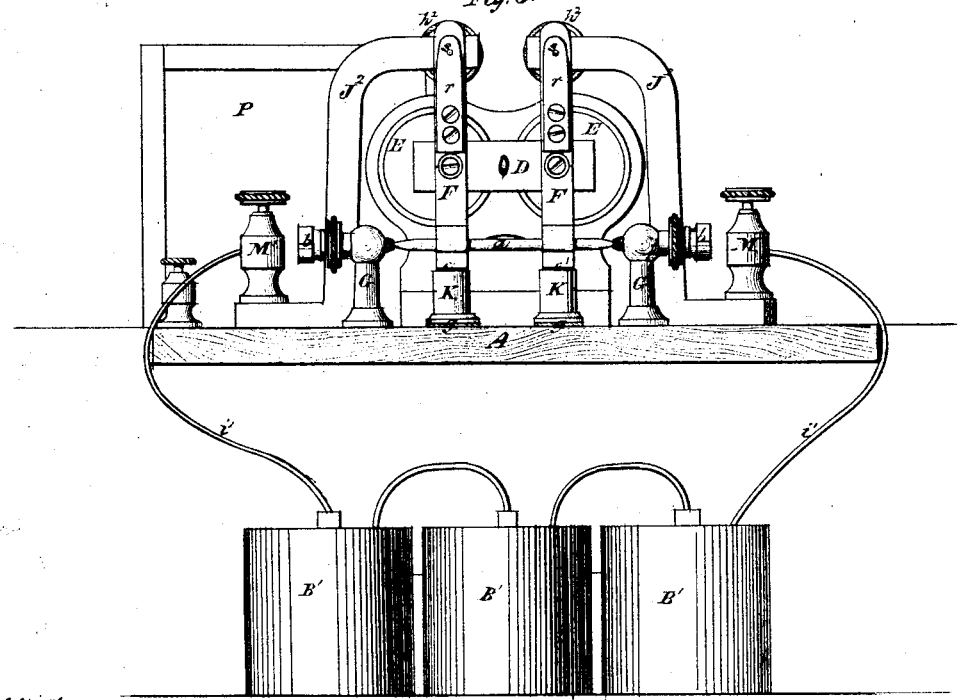

UNITED STATES PATENT OFFICE.

EDWARD M. PIERSON, OF NEWARK, NEW JERSEY, ASSIGNOR TO EDWIN D. McCRACKEN, OF NEW YORK, N. Y.

IMPROVEMENT IN SWITCHES FOR GALVANIC BATTERIES.

Specification forming part of Letters Patent No. 108,513, dated October 18, 1870.

*To all whom it may concern:*

Be it known that I, EDWARD M. PIERSON, of the city of Newark, in the county of Essex and State of New Jersey, have invented a new and useful Improvement in Switches for Galvanic Batteries and in the Means of Operating the same; and I do hereby declare that the following is a full, clear, and exact description of the same, reference being had to the accompanying drawings, forming part of this specification.

This invention consists in the novel construction of a switch and novel automatic means of operating such a device under the control of a clock-movement for the purpose of bringing one and the other of two galvanic batteries alternately into and out of the circuit of a telegraph-line or any other electric circuit, the object being to enable the two batteries to operate alternately, that each may be enabled to recover its strength by a suspension of its action while the other is in operation, and that the strength of the batteries may thereby be kept up for a long time without renewing the chemicals, and a telegraph-line or other electrical apparatus worked by the two batteries alternately may so be enabled to operate with more uniform effectiveness than is possible when operated by a single battery.

The invention embraces the combination of a clock-movement with two batteries and a suitable device for bringing each battery in turn into and out of an electric circuit, whereby the said device is so controlled by the clock-movement as to bring the batteries alternately into and out of the circuit at regular or definite intervals.

Figure 1:
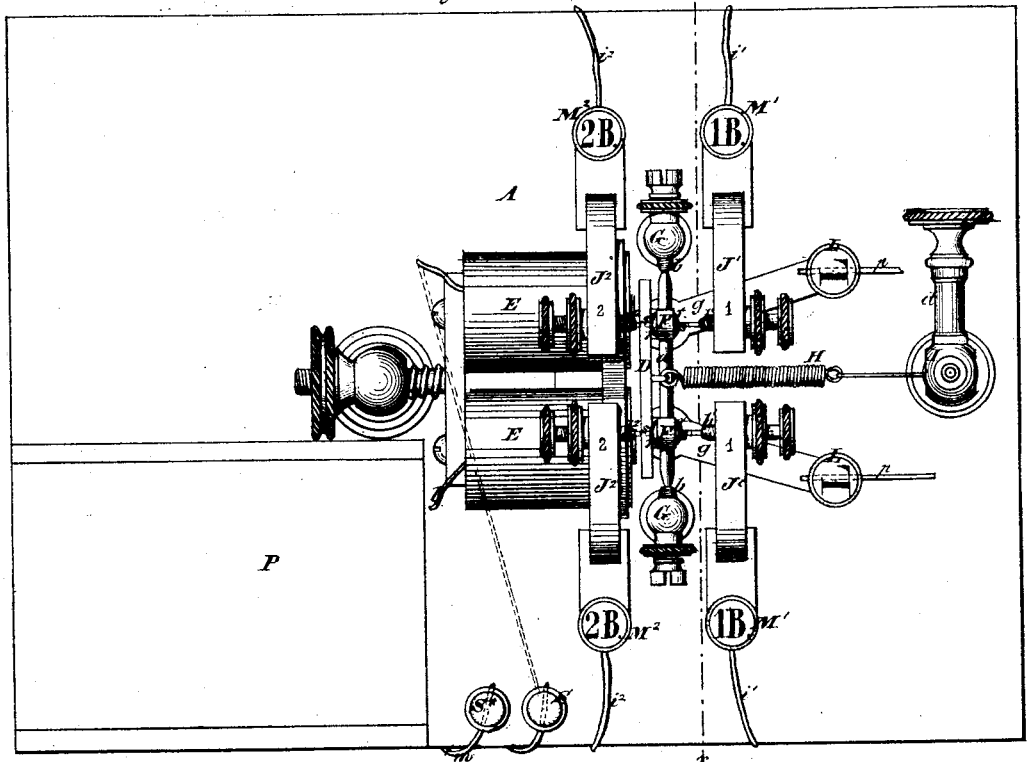
Figure 2:
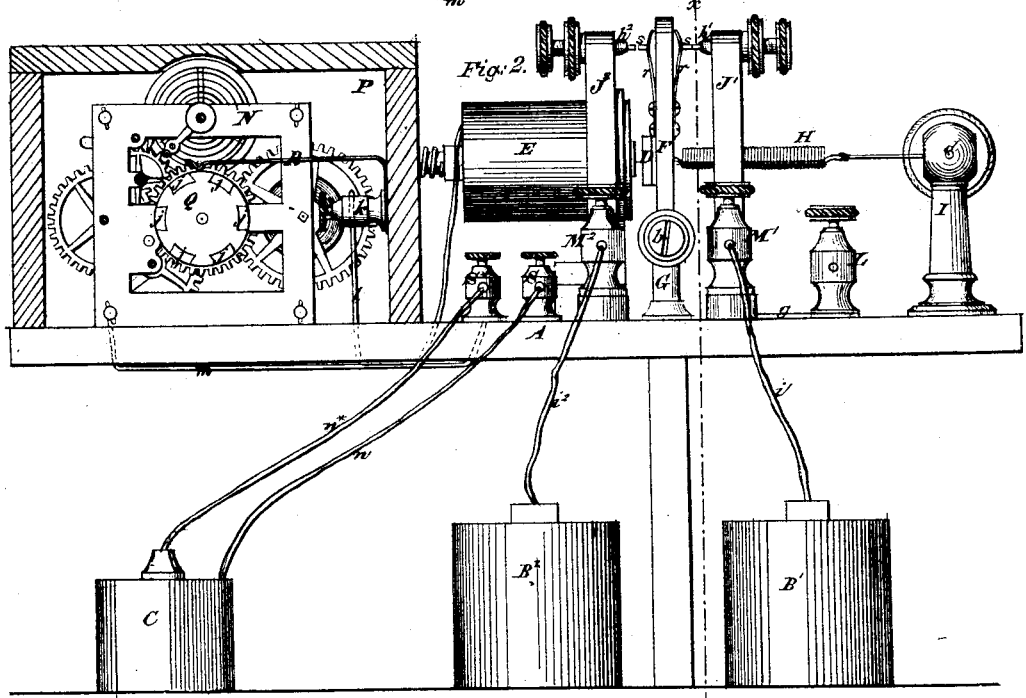

Figure 1 in the accompanying drawings is a plan of the switch and its operating mechanism. Fig. 2 is a side elevation of the same and of the two alternating batteries and of a local battery employed to work the switch. Fig. 3 is a transverse section, taken in the plane indicated by the line $x\ x$ in Figs. 1 and 2. Fig. 4 is a side elevation of the switch, partly in section, on a larger scale than Figs. 1, 2, and 3.

Similar letters of reference indicate corresponding parts in the several figures.

$B'\ B^2$ represent two separate main batteries intended to be used alternately for working a telegraph-line.

A represents a base of wood or other insulating material, upon which the switch and its operating mechanism are placed, arranged in any suitable position more or less distant from the batteries $B'\ B^2$.

C is a local battery, by means of which the switch is worked, arranged in any convenient location near the batteries $B'\ B^2$ or the board A.

E is an electro-magnet in the circuit of the local battery secured upon the board A.

D is the armature of the said magnet carried by two brass levers, F F', which constitute the principal parts of the switch. These levers are secured firmly to a horizontal shaft, $a$, which works between two center screws, $b\ b$, the supports G G of which are secured to the board A. These levers are insulated from each other by bushes $c$, Fig. 4, interposed between them and the shaft $a$. The armature is also insulated from these levers.

H is a spiral spring connecting the armature with a tension-adjuster, $d$, supported in a post, I, secured in the board A, for the purpose of drawing back the armature from the poles of the electro-magnet when the local circuit is open.

Under each of the two armature-levers there is secured to the board A one of two brass posts, K K, into each of which is fitted a brass piston, $e$, (shown in Fig. 4,) which is pressed upward by a spiral spring, $f$, within its respective post into contact with the bottom of its respective armature-lever. The two posts K K are insulated from each other by the board A and connected by brass plates $g\ g$, each with one of the two terminal set-screws L L, with which the ends of the line-wire $p$ are connected.

$J'\ J'$ are a pair of crane-shaped posts secured to the board A in front of the armature levers or switch F F, and $J^2\ J^2$ are a similar pair of posts secured to the said board in rear of the said levers or switch, the said posts being all insulated from each other by the board. In the upper parts of the posts $J'\ J'$ are two set-screws, $h'\ h'$, and in the upper parts of the post $J^2\ J^2$ are two set-screws, $h^2\ h^2$. The armature levers or switch play between these set-screws $h^2 h^2$ and $h' h'$ as the local circuit is closed and opened, and the armature thereby drawn toward the poles of the electro-magnet, and drawn back by the spring H. The opposite poles of the battery B' are connected one with each of the posts J' J' by wires $i'$ $i'$, which are held by two binding-screws, M' M', secured to the feet of the said posts. The opposite poles of the battery B² are in like manner connected one with each of the two posts J² J² by wires $i^2$ $i^2$, held by binding-screws M² M². Either battery is brought into the circuit of the line-wire, according to whether the switch F is in contact with the set-screws $h' h'$ or with those $h^2 h^2$, the switch forming a necessary part of the circuit, as will be hereinafter described.

N, Fig. 2, is an ordinary clock-movement, arranged within a box, P, on the board A, for the purpose of carrying and giving rotary motion to the circuit-breaker Q, which consists of a disk of brass having pieces of ivory or other non-conducting material $j$ $j$ inserted into its periphery at regular intervals.

R is a brass spring secured to the inside of the box P by a set-screw, $k$, and pressing on the periphery of the circuit-breaker Q. The set-screw $k$ is connected by a wire, $l$, with one end of the coils of the electro-magnet E, the other end of the coils of which is connected with a binding-screw, S, on the board A. One pole of the local battery is connected by a wire, $n$, with the binding-screw S, and the other by a wire, $n^*$, with a similar binding-screw, S*, arranged on the board A. This binding-screw S* is connected by a wire, $m$, with the brass frame of the clock-movement. Between this frame and the brass disk of the circuit-breaker Q there is a metallic connection made by the spindle of the latter. When the brass periphery of the circuit-breaker is in contact with the spring R the circuit of the local battery and electro-magnet is closed, and when one of the pieces of ivory $j$ $j$ is presented in contact with the said spring the said circuit is open.

When the circuit of the local battery and magnet is open the armature D is drawn away from the magnet by the spring H, and the switch F F is in contact with the set-screws $h' h'$, and the circuit is closed through the battery B'. The circuit through this battery may be traced upon the drawings. Commencing at the positive pole of the battery, its direction is through the connecting-wire $i'$, the binding-screw M', the nearest post J', and its set-screw $h'$; thence through the contiguous lever F of the switch, its piston $e$, support K, plate $g$, and binding-screw L; thence over the line to the other screw L, whence it passes through the other plate $g$, support K, piston $e$, and lever F to the other set-screw, $h'$, through its post J' and binding-screw M', and thence through the connecting-wire $i'$ to the negative pole of the battery. When the circuit of the local battery and magnet is closed the armature is attracted and the switch is in contact with the set-screws $h^2 h^2$, and the circuit is closed through the battery B², its direction being from the battery through one wire, $i^2$, binding-screw M², post J², and set-screw $h^2$, and through one of the two switch-levers F, its piston $e$, support K, plate $g$, and binding-screw L, and over the line; thence through the other binding-screw L, plate $g$, support K, piston $e$, switch-lever F, set-screw $h^2$, post J², binding-screw M², and wire $i^2$ to the battery.

From the foregoing explanation it may be understood that either battery B' or B² is in the circuit of the line, according to whether the circuit of the local battery is open or closed; and it will be readily understood that the action of the rotary circuit-breaker Q, which opens and closes the local-battery circuit, and so produces the movement of the switch F F at regular intervals, will cause each of the batteries B' and B² to be in turn and at regular intervals brought into the line-circuit, and the other one to be at the same time thrown out of the said circuit, and that the line will be during regular periods worked first by one and then by the other of the two batteries, one being always at rest.

In order to prevent any intermission in the current over the line by interruption of the circuit during the time of changing the position of the switch, the switch-levers have each attached on each side a metal spring, $r$, to which is attached opposite to its respective set-screw $h'$ or $h^2$ a platinum point, $s$, the set-screws being also platinum-pointed. These springs are so arranged that in the movement of the switch the platinum points of those on one side of the lever will come in contact with their respective set-screws $h' h'$ or $h^2 h^2$ before the points of those springs on the other side break contact with their respective set-screws.

Although I prefer generally to use, for the purpose of throwing the two batteries into and out of the circuit, a switch operated by a battery and electro-magnet, yet I may in some cases prefer, for the sake of greater simplicity or for other reason, to dispense with the local battery and magnet and use only a circ breaker, the metallic portion of which forms a portion of both battery-circuits, and which is worked by a clock-movement, such circuit-breaker working in contact with two springs like R or its equivalent, which form portic of the two battery-circuits, and to each which the metallic and non-conducting ptions of the circuit-breaker are presented i turn.

What I claim as my invention, and desire to secure by Letters Patent, is—

1. The combination of two batteries, a circuit breaking and closing device, and a clock-movement with a telegraph-line or other elec tric circuit, whereby, the two batteries are alternately and at regular or definite intervals brought one into and the other out of the said circuit, substantially as and for the purpose herein specified.

2. The combination of two batteries, an electro-magnet worked by a separate local battery, and a switch so worked by the armature of such magnet, substantially as herein described, between portions of the two circuits of such batteries, as to produce the closing of each of the two circuits in turn, one being opened while the other is closed.

3. The combination of the two batteries $B'$ $B^2$, the local battery, electro-magnet E, armature D, levers F F, supports G G, posts $J'$ $J'$ $J^2$ $J^2$, rotary circuit-breaker Q, spring R, and their several connections, substantially as and for the purpose herein described.

4. The springs $r$ $r$, in combination with the switch or armature levers F F, and the set-screws $h'$ $h'$ $h^2$ $h^2$, or other equivalent portions of the two battery-circuits, substantially as and for the purpose herein described.

E. M. PIERSON.

Witnesses:
   FRED. HAYNES,
   R. E. RABEAU.